US009465816B2

(12) United States Patent
Johnson et al.

(10) Patent No.: US 9,465,816 B2
(45) Date of Patent: Oct. 11, 2016

(54) GENERATING AN IMAGE OF A FLOOR PLAN

(71) Applicant: International Business Machines Corporation, Armonk, NY (US)

(72) Inventors: Randy S. Johnson, O'Fallon, MO (US); Tedrick N. Northway, Wood River, IL (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 562 days.

(21) Appl. No.: 13/969,649

(22) Filed: Aug. 19, 2013

(65) Prior Publication Data

US 2015/0049959 A1   Feb. 19, 2015

(51) Int. Cl.
*G06F 17/30* (2006.01)
*H04W 4/04* (2009.01)

(52) U.S. Cl.
CPC ... *G06F 17/30268* (2013.01); *G06F 17/30867* (2013.01); *H04W 4/043* (2013.01)

(58) Field of Classification Search
CPC combination set(s) only.
See application file for complete search history.

(56) References Cited

U.S. PATENT DOCUMENTS

| | | | |
|---|---|---|---|
| 7,145,469 B2 | 12/2006 | Kokonaski et al. |
| 7,349,863 B1 | 3/2008 | Peña-Mora et al. |
| 7,358,861 B2 | 4/2008 | Blum et al. |
| 7,598,966 B2 | 10/2009 | Rye et al. |
| 7,818,120 B2 | 10/2010 | Poreda et al. |
| 7,924,149 B2 | 4/2011 | Mendelson |
| 8,191,005 B2 | 5/2012 | Baier et al. |
| 8,417,446 B2 | 4/2013 | Mays |
| 2006/0262188 A1 | 11/2006 | Elyada et al. |
| 2007/0001904 A1 | 1/2007 | Mendelson |
| 2009/0102697 A1 | 4/2009 | Antonsson |
| 2009/0105994 A1 | 4/2009 | Mandolini et al. |
| 2009/0216438 A1 | 8/2009 | Shafer |
| 2010/0223031 A1 | 9/2010 | Vincent et al. |
| 2011/0270584 A1 | 11/2011 | Plocher et al. |
| 2012/0130632 A1 | 5/2012 | Bandyopadhyay et al. |
| 2013/0047120 A1 | 2/2013 | Albright |
| 2013/0073996 A1 | 3/2013 | Garcia et al. |
| 2013/0080457 A1 | 3/2013 | Narayanan et al. |

FOREIGN PATENT DOCUMENTS

WO   2011014292 A1   2/2011

OTHER PUBLICATIONS

Alzantot et al.; "CrowdInside: Automatic Construction of Indoor Floorplans", ACM SIGSPATIAL GIS '12, Proceedings of The 20th International Conf. on, Nov. 6-9, 2012, pp. 99-108, Copyright 2012 ACM.

Shin et al.; "Unsupervised Construction of an Indoor Floor Plan Using a Smartphone", IEEE Transactions on Systems, Man, and Cybernetics—Part C: Applications and Reviews, vol. 42, No. 6, Nov. 2012, pp. 889-898, Copyright 2011 IEEE.

Valero et al.; "Automatic Method for Building Indoor Boundary Models from Dense Point Clouds Collected by Laser Scanners", Sensors 2012, 12, Nov. 22, 2012, pp. 16099-16115, ISSN 1424-8220, Copyright 2012, <www.mdpi.com/journal/sensors>.

*Primary Examiner* — Thomas Tarcza
*Assistant Examiner* — Edward J Pipala
(74) *Attorney, Agent, or Firm* — Anthony Canale; Andrew M. Calderon; Roberts Mlotkowski Safran Cole & Calderon, P.C.

(57) ABSTRACT

Program code on a mobile computing device and a server computer determines a location of a mobile computing device within a facility, based on coordinates associated to the location. The program code assigns a timestamp to the coordinates that are associated to the location. The program code stores location information in a database, wherein the location information includes the coordinates associated to the location, the timestamp that is assigned to the coordinates, and a unique identifier of the mobile computing device. The program code generates an image of a floor plan of the facility.

20 Claims, 5 Drawing Sheets

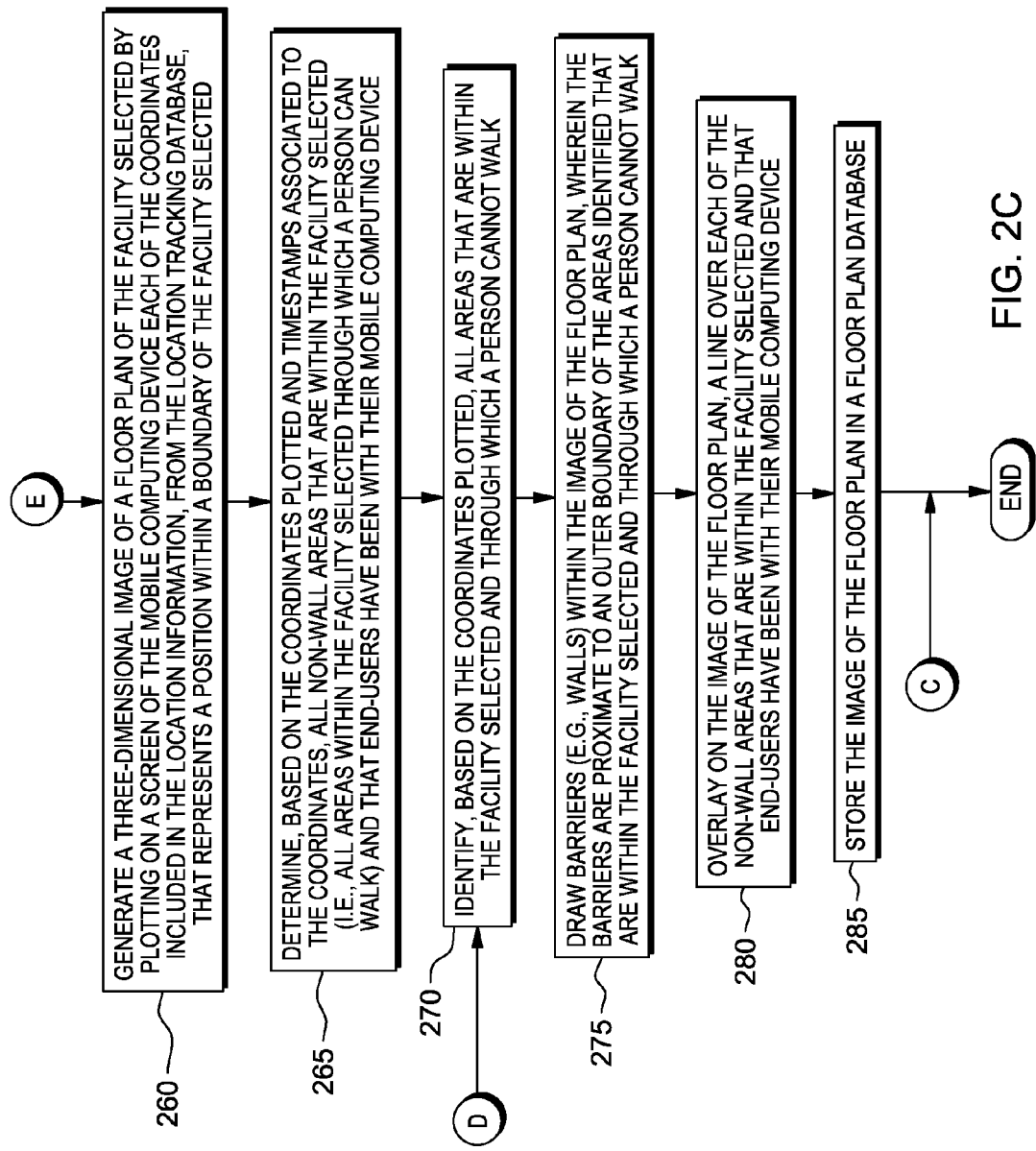

GENERATING AN IMAGE OF A FLOOR PLAN

BACKGROUND

1. Field of the Invention

The present invention relates generally to floor plans, and more particularly to generating an image of a floor plan of a facility based on data collected from mobile computing devices having location tracking functionality.

2. Description of the Related Art

A floor plan is typically printed out on paper and posted on a wall at the entrance (e.g., main lobby area) of a facility to provide a person such as a visitor or emergency response personnel with an illustration of the layout of each floor of the facility. The floor plan that is printed may also be posted at other areas throughout the facility to show exit routes to be used in case of an emergency evacuation of the facility. However, the facility may undergo renovation, which causes various changes in the floor plan. Therefore, it may be difficult to timely create updated versions of the floor plan, and replace each floor plan that is posted within the facility with one of the updated versions of the floor plan. Accordingly, visitors and emergency response personnel that need guidance for navigating the facility may have to utilize a printed floor plan posted within the facility that is outdated and non-portable. Moreover, the printed floor plan may not be readily available to visitors and emergency personnel as they are navigating the facility, because the printed floor plan may be only posted at select locations throughout the facility.

SUMMARY

Aspects of an embodiment of the present invention disclose a method, computer system, and program product for generating an image of a floor plan of a facility. A computer determines a location of a mobile computing device within a facility, based on coordinates associated to the location. The computer assigns a timestamp to the coordinates that are associated to the location. The computer stores location information in a database, wherein the location information includes the coordinates associated to the location, the timestamp that is assigned to the coordinates, and a unique identifier of the mobile computing device. The computer generates an image of a floor plan of the facility.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

FIGS. 2A-2C are flowcharts illustrating operations of the program code according to an embodiment of the present invention.

DETAILED DESCRIPTION

Figure 1:
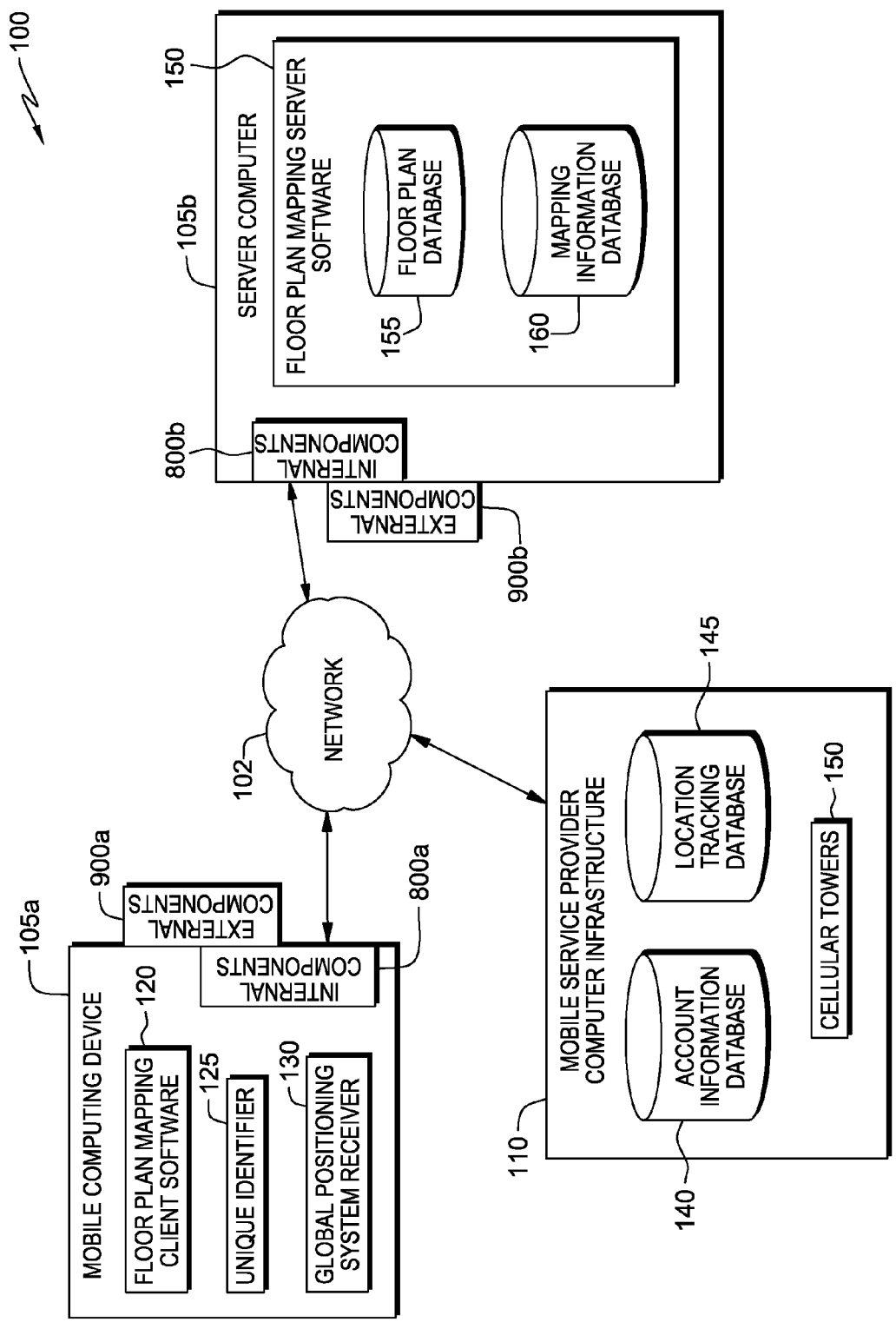
FIG. 1 is a block diagram of a distributed computer system that includes a mobile computing device having floor plan mapping client software and a server computer having floor mapping server software, wherein the floor plan mapping client software and floor plan mapping server software are program code for generating an image of a floor plan based on data collected from one or more mobile computing devices having location tracking functionality according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide floor plan mapping client software and floor plan mapping server software, which are program code for generating an image of a floor plan of a facility based on data collected from mobile computing devices having location tracking functionality.

FIG. 1 illustrates computer system 100 that includes network 102, mobile computing device 105a, server computer 105b, and mobile service provider computer infrastructure 110. Mobile computing device 105a and server computer 105b can interact and exchange data (i.e., communicate) with each other via network 102. Moreover, mobile computing device 105a and mobile service provider computer infrastructure 110 can also interact and exchange data with each other via network 102. Specifically, mobile computing device 105a includes floor plan mapping client software application 120 and a unique identifier (ID) 125 (e.g., an electronic serial number assigned to mobile computing device 105a, or a unique user ID assigned to a radio-frequency identification tag attached to mobile computing device 105a), and global positioning system (GPS) receiver 130.

Mobile service provider computer infrastructure 110 includes account information database 140, location tracking database 145, and cellular towers 150. Account information database 140 is utilized for storing account information of each end-user logged into the floor plan mapping client software application 120 on a mobile computing device (e.g., mobile computing device 105a). The account information can include a name of an end-user, a telephone number of the end-user, an address of the end-user, and a unique ID (e.g., unique identifier 125) associated to the mobile computing device of the end-user. The account information can be utilized for determining where the end-user has visited, which can be utilized by emergency response personnel. Location tracking database 145 is utilized for storing location information (e.g., position tracking information) associated to a location of the mobile computing device. The location information includes coordinates that are associated to a location of the mobile computing device, a timestamp associated to the coordinates, and unique ID (e.g., unique ID 125) associated with the mobile computing device. The coordinates that are associated to the location of the mobile computing device can be determined via GPS receiver 130, a radio-frequency identification (RFID) tag and/or RFID reader, a multilateration technique, and/or a triangulation technique.

The multilateration technique can include the use of the timestamps (e.g., use of signal transmission times) associated to the coordinates in order to generate an accurate image of a floor plan. The triangulation technique can include the use of cellular towers 150. If the triangulation technique is utilized, then the accuracy of the coordinates is based on how close together cellular towers 150 are. Specifically, the closer cellular towers are to each other the more accurate the coordinates are, and the further away cellular towers are from each other the less accurate the coordinates are.

Furthermore, server computer 105b includes floor plan mapping server software application 150, floor plan database 155, and mapping information database 160. Floor plan database 155 includes electronic records each with a first field for storing a unique ID associated with a facility having an electronic record within mapping information database 160, and a second field for storing each image of a floor plan associated with the facility. Thus, mapping information database 160 includes an electronic record for storing a map, and additional electronic records each having a first field for storing one more external images of a facility on the map, a second field for storing a unique ID associated with the facility, and a third field for storing coordinates of at least one boundary that defines an area of the facility.

Figure 2A:
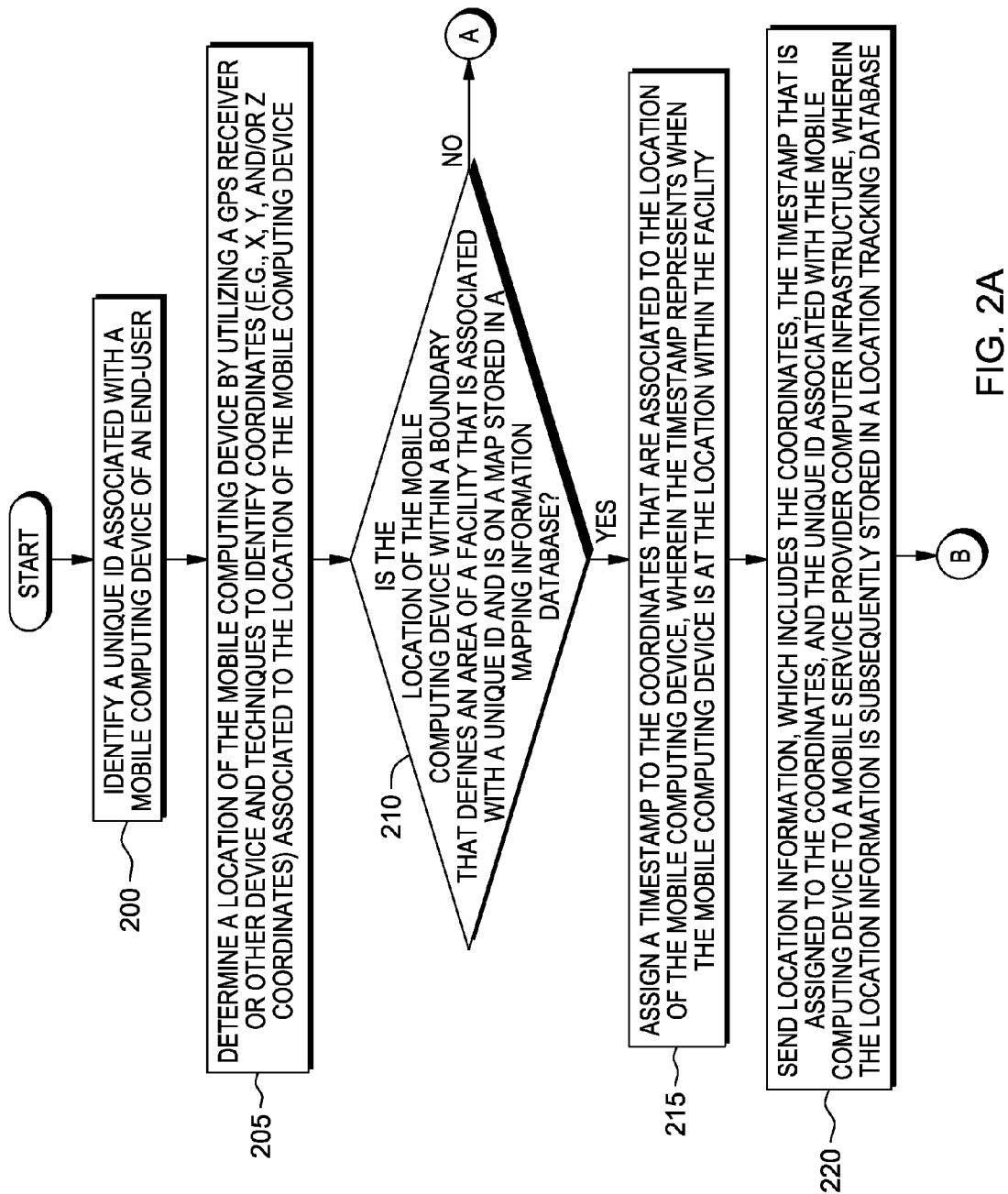
Figure 2B:
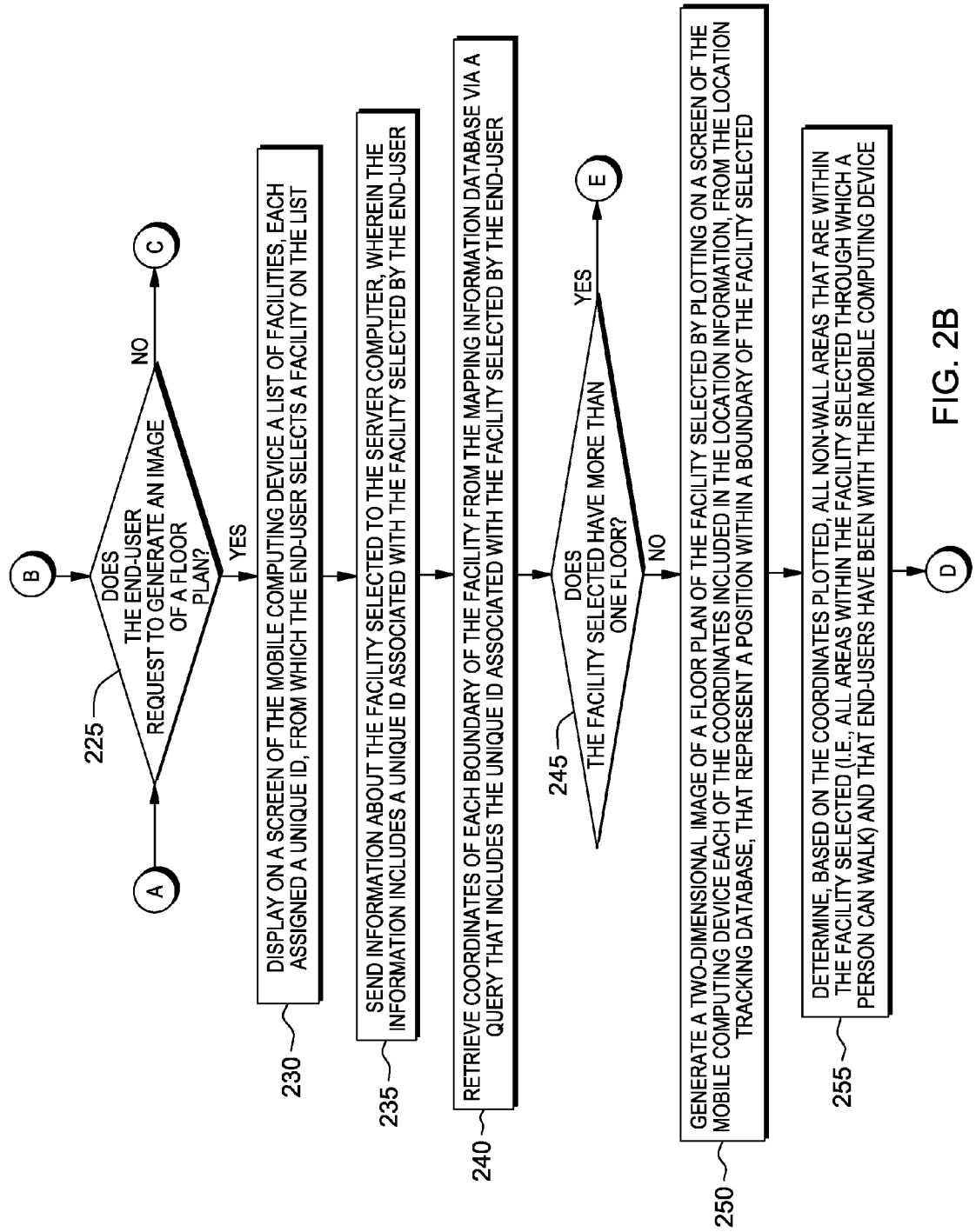

FIGS. 2A-2C are flowcharts illustrating the steps of program code, floor plan mapping client software 120 and floor plan mapping server software 140, for generating an image of a floor plan based on data collected from each mobile computing device 105a, which is connected to network 102, having location tracking functionality. An accurate floor plan of a facility on an electronic map can be generated, based on the data collected from each mobile computing device 105a that comes into the facility. In the disclosed embodiment, the program code on mobile computing device 105a identifies unique ID 125 associated with mobile computing device 105a of an end-user (block 200). Next, the program code determines a location of mobile computing device 105a by utilizing GPS receiver 130 or other device and techniques to identify coordinates (e.g., x, y, and/or z coordinates) associated to the location of mobile computing device 105a (block 205). In particular, the other device can be a radio-frequency identification (RFID) tag and/or RFID reader, and the other techniques can include multilateration and/or triangulation.

Next, the program code determines if the location of mobile computing device 105a is within a boundary that defines an area of a facility that is associated with a unique ID and is on a map stored in mapping information database 160 (decision block 210). Specifically, in order to determine if the location of mobile computing device 105a is within a boundary that defines an area of a facility on the map, the program code queries mapping information database to identify a facility, if any, having coordinates of a boundary defining an area that includes the coordinates associated to the location of mobile computing device 105a. As mentioned above, in the disclosed embodiment, the program code identifies the coordinates that are associated to the location of mobile computing device 105a by utilizing GPS receiver 130. However, in other embodiments the program code can utilize a multilateration technique or a triangulation technique to identify the coordinates (e.g., x, y, and z coordinates) associated to the location of mobile computing device 105a, wherein the triangulation technique may include the use of cellular towers 150. If the location of mobile computing device 105a is not within the boundary that defines the area of a facility that is associated with a unique ID and is on a map stored in mapping information database 160 (the "NO" branch of decision block 210), then the program code determines, based the end-user's input via a user interface of the program code, if the end-user wants to generate an image of a floor plan (decision block 225).

Otherwise, if the location of mobile computing device 105a is within the boundary that defines the area of the facility on the map (the "YES" branch of decision block 210), then the program code assigns a timestamp to the coordinates that are associated to the location of mobile computing device 105a, wherein the timestamp represents when mobile computing device 105a is at the location within the facility (block 215). Next, the program code sends location information, which includes the coordinates, the timestamp that is assigned to the coordinates, and unique ID 125 associated with mobile computing device 105a to mobile service provider computer infrastructure 110, wherein the location information is subsequently stored in location tracking database 145 (block 220). As an end-user moves throughout the facility with their mobile computing device 105a the program code continues to determine if the location of mobile computing device 105a is within a boundary that defines an area of a facility on the map that is stored in mapping information database 160. Thus, as more end-users each having their own mobile computing device 105a navigate through the facility, location information (i.e., coordinates and a timestamp that is assigned to the coordinates) of each mobile computing device 105a is sent to mobile service provider computer infrastructure 110. The location information that is received from each mobile computing device 105a is stored in location tracking database 145 and can be retrieved by utilizing a query that includes the unique ID 125 associated with mobile computing device 105a.

Next, the program code determines based on input from the end-user, via a user interface, if the end-user requests to generate an image of a floor plan (decision block 225). The user-interface is provided by the program code. If the program code determines the end-user does not request to generate an image of a floor plan (the "NO" branch of decision block 225), then the program code ends. Otherwise, if the program code determines the end-user requests to generate an image of a floor plan (the "YES" branch of decision block 225), then the program code displays on a screen of mobile computing device 105a a list of facilities, each assigned a unique ID, from which the end-user selects a facility on the list (block 230). Specifically, each facility on the list is within a configurable range of (i.e., configurable distance from) mobile computing device 105a. In the disclosed embodiment, the configurable range is set as 0 to 3 feet from mobile computing device 105a. However, in other embodiments the configurable range can be set as 0 to a value greater than 3 feet.

Subsequently, the program code sends information about the facility selected to server computer 105b, wherein the information includes a unique ID associated with the facility selected by the end-user (block 235). Next, the program code on server computer 105b retrieves coordinates of each boundary of the facility from mapping information database 160 via a query that includes the unique ID associated with the facility selected by the end-user (block 240). Subsequent to retrieving the coordinates of each boundary of the facility, the program code determines if the facility selected has more than one floor (decision block 245).

In particular, the program code can determine if the facility selected has more than one floor by using a query to extract from location tracking database 145 location information satisfying the following criteria: location information having a set of coordinates (e.g., x and y coordinates) that are within a two-dimensional boundary of the facility selected, and the location information having a third-dimensional coordinate (e.g., having a z coordinate) that is associated with the set of coordinates. If no location information satisfying the criteria is return in response to the query, then the program code determines that the facility selected does not have more than one floor. Otherwise, if location information satisfying the criteria is returned in response to the query, then the program code determines that the facility selected does have more than one floor.

If the program code determines the facility selected does not have more than one floor (the "NO" branch of decision block 245), then the program code generates a two-dimensional image of a floor plan of the facility selected by plotting on a screen of mobile computing device 105a each of the coordinates included in the location information, from location tracking database 145, that represent a position within a boundary of the facility selected (block 250). The boundary is retrieved from mapping information database 160.

Subsequently, the program code determines, based on the coordinates plotted, all non-wall areas that are within the facility selected (i.e., all areas within the facility selected through which a person can walk) and that end-users have been with their mobile computing device 105a (block 255). For example, in the disclosed embodiment, the non-wall areas can include doorways, hallways, and rooms that are within the facility selected. In addition, the program code identifies, based on the coordinates plotted, all areas that are within the facility selected and through which a person cannot walk (block 270). Specifically, the program code identifies areas within the facility selected that no end-users have been with their mobile computing device 105a as the areas that are within the facility selected and through which a person cannot walk. As more coordinates are plotted on the screen over time within each boundary of the facility selected, the program code can more accurately identify areas that are within the facility selected and through which a person can or cannot walk. Next, the program code draws barriers (e.g., walls) within the image of the floor plan, wherein the barriers are proximate to an outer boundary of the areas identified that are within the facility selected and through which a person cannot walk (block 275). Furthermore, the program code overlays on the image of the floor plan, a line over each of the non-wall areas that are within the facility selected and that end-users have been with their mobile computing device 105a (block 280).

Subsequently, the program code stores the image of the floor plan in floor plan database 155 (block 285), then the program code ends. The end-user of mobile computing device 105a or other end-users (e.g., emergency response personnel) having a mobile computing device 105a connected to network 102 can subsequently access and view the image of the floor plan, via a user interface of the program code on their mobile computing device 105a.

Otherwise, if the program code determines the facility selected has more than one floor (the "YES" branch of decision block 245), then the program code generates a three-dimensional image of a floor plan of the facility selected by plotting on a screen of mobile computing device 105a each of the coordinates included in the location information, from location tracking database 145, that represent a position within a boundary of the facility selected (block 260). The boundary is retrieved from mapping information database 160. Subsequently, the program code determines, based on the coordinates plotted and timestamps associated to the coordinates, all non-wall areas that are within the facility selected (i.e., all areas within the facility selected through which a person can walk) and that end-users have been with their mobile computing device 105a (block 265). For example, in the disclosed embodiment, the non-wall areas can include doorways, hallways, rooms, staircases, and elevators that are within the facility selected.

Moreover, software analytics can be utilized with the program code to more accurately determine each floor, staircase, and elevator within the facility selected. Specifically, the software analytics includes identifying patterns within velocity, distance, and time computations that are based on the data collected from each mobile computing device 105a. In the disclosed embodiment, an accelerometer within each mobile computing device 105a can be utilized to compute the velocity for the software analytics mentioned above. Furthermore, sensors within each mobile computing device 105a (e.g., atmospheric pressure sensors for determining pressure changes based on a change in altitude of a mobile computing device 105a) can be utilized by the program code to increase the accuracy of the program code determining each floor, staircase, and elevator within the facility.

In addition, the program code identifies, based on the coordinates plotted, all areas that are within the facility selected and through which a person cannot walk (block 270). Specifically, the program code identifies areas within the facility selected that no end-users have been with their mobile computing device 105a as the areas that are within the facility selected and through which a person cannot walk. As more coordinates are plotted on the screen over time within each boundary of the facility selected, the program code can more accurately identify areas that are within the facility selected and through which a person can or cannot walk. Next, the program code draws barriers (e.g., walls) within the image of the floor plan, wherein the barriers are proximate to an outer boundary of the areas identified that are within the facility selected and through which a person cannot walk (block 275). Furthermore, the program code overlays on the image of the floor plan, a line over each of the non-wall areas that are within the facility selected and that end-users have been with their mobile computing device 105a (block 280).

Subsequently, the program code stores the image of the floor plan in floor plan database 155 (block 285), then the program code ends. The end-user of mobile computing device 105a or other end-users (e.g., emergency response personnel) having a mobile computing device 105a connected to network 102 can subsequently access and view the image of the floor plan, via a user interface of the program code on their mobile computing device 105a.

Figure 3:
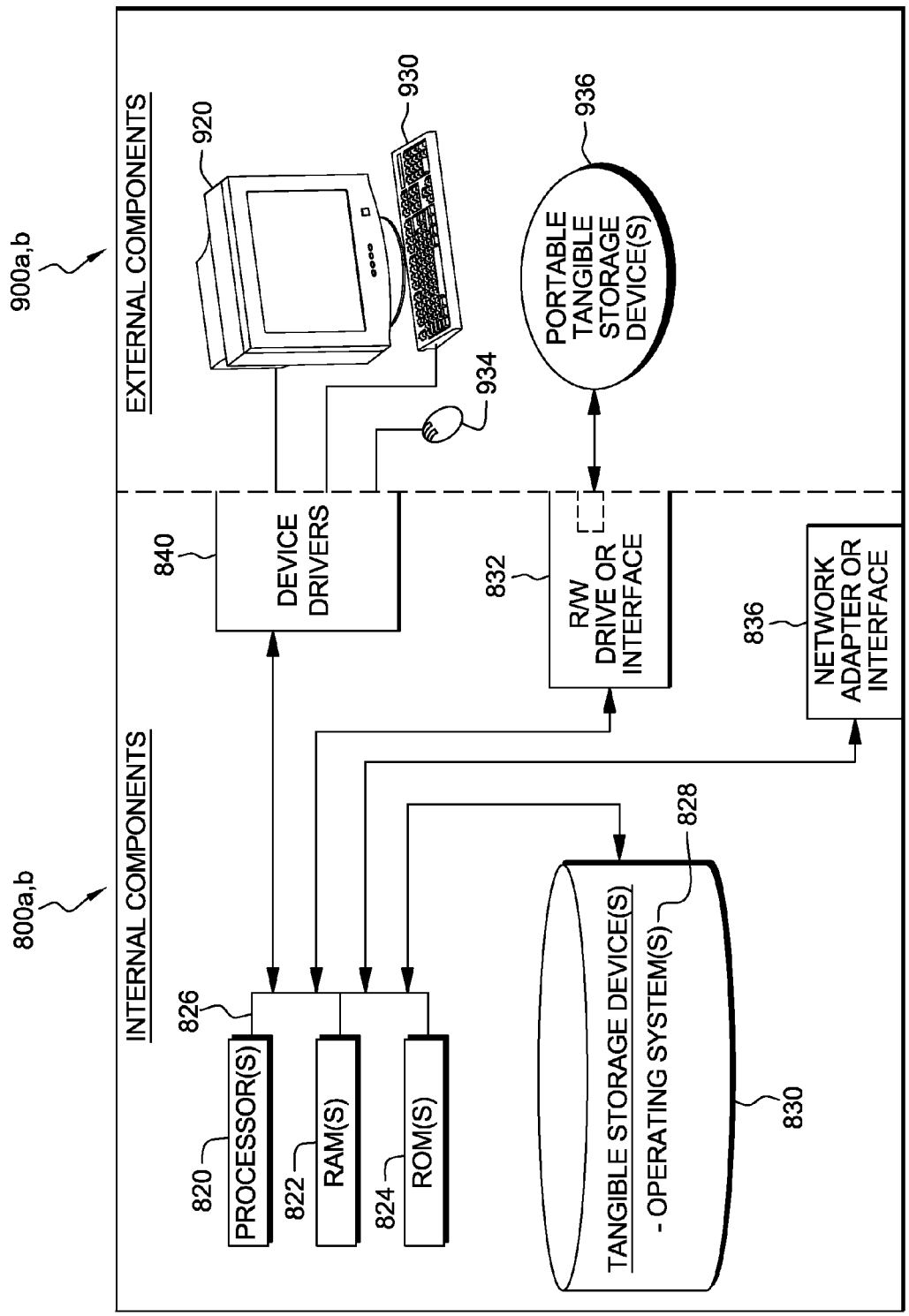
FIG. 3 is a block diagram depicting internal and external components of the mobile computing device and the server computer of FIG. 1 according to an embodiment of the present invention.

FIG. 3 is a block diagram depicting a set of internal components 800a and 800b and a set of external components 900a and 900b that correspond to respective mobile computing device 105a and server computer 105b. Internal components 800a and 800b each include one or more processors 820, one or more computer readable RAMs 822 and one or more computer readable ROMs 824 on one or more buses 826, and one or more operating systems 828 and one or more computer readable tangible storage devices 830. The one or more operating systems 828, and floor plan mapping client software 120 on mobile computing device 105a; and floor plan mapping server software 150 on server computer 105b are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Floor plan mapping client software 120 on mobile computing device 105a; and floor plan mapping server software 150 on server computer 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Floor plan mapping client software 120 on mobile computing device 105a; and floor plan mapping server software 150 on server computer 105b can be downloaded to respective mobile computing device 105a and server computer 105b from an external computer or external storage device via a network (for example, the Internet, a LAN, or a WAN) and respective network adapters or interfaces 836. From the network adapter or interface 836, floor plan mapping client software 120 on mobile computing device 105a; and floor plan mapping server software 150 on server computer 105b are loaded into at least one respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for generating an image of a floor plan of a facility based on data collected from mobile computing devices having location tracking functionality. However, numerous modifications substitutions can be made without deviating from the scope of an embodiment of the invention. Therefore, one or more embodiments of the invention have been disclosed by way of example and not limitation.

What is claimed is:

1. A computer-implemented method for generating an image of a floor plan of a facility, the method comprising the steps of:
   determining a location of a mobile computing device within a facility using a location determination hardware component, based on coordinates associated to the location that are obtained using the location determination hardware component;
   assigning a timestamp to the coordinates that are associated to the location;
   storing location information in a computer-accessible database, wherein the location information includes the coordinates associated to the location, the timestamp that is assigned to the coordinates, and a unique identifier of the mobile computing device;
   generating an image of a floor plan of the facility based on the stored location information, wherein generation the image includes access n the computer-accessible database using a floor plan mapping component; and
   outputting the image of the floor plan for storage in a computer-accessible floor plan database.

2. The method of claim 1, wherein the step of determining the location of the mobile computing device within the facility comprises utilizing at least one of a global positioning system receiver, a radio-frequency identification (RFID) tag and a RFID reader, a multilateration technique, and a triangulation technique to identify coordinates associated to the location of the mobile computing device.

3. The method of claim 1, wherein the timestamp represents when mobile the computing device is at the location.

4. The method of claim 1, wherein the step of generating the image of the floor plan of the facility comprises plotting on a screen of the mobile computing device each of the coordinates that are stored in the computer-accessible database and represent a position within a boundary of the facility.

5. The method of claim 1, wherein the step of generating the image of the floor plan of the facility comprises drawing barriers within the image of the floor plan of the facility, wherein the barriers are proximate to an outer boundary of areas within through which a person cannot walk within the facility.

6. The method of claim 1, wherein the step of generating the image of the floor plan of the facility comprises overlaying on the image of the floor plan of the facility, one or more lines that represent where a person can walk within the facility and end-users with the mobile computing device have been.

7. The method of claim 1, wherein the step of determining the location of the mobile computing device within the facility comprises utilizing a radio-frequency identification (RFID) tag and a RFID reader to identify coordinates associated to the location of the mobile computing device.

8. The method of claim 1, further comprising determining non-wall areas within the facility based on the coordinates, wherein generating the image of the floor plan is further based on determining the non-wall areas.

9. A computer program product for generating an image of a floor plan of a facility, the computer program product comprising:
   a computer readable storage medium and program instructions stored on the computer readable storage medium, the program instructions comprising:
   program instructions to determine a location of a mobile computing device within a facility using a location determination hardware component, based on coordinates associated to the location that are obtained using the location determination hardware component;
   program instructions to assign a timestamp to the coordinates that are associated to the location;
   program instructions to store location information in a computer-accessible database, wherein the location information includes the coordinates associated to the location, the timestamp that is assigned to the coordinates, and a unique identifier of the mobile computing device; and
   program instructions to generate an image of a floor plan of the facility based on the stored location information, wherein generating the image includes accessing the computer-accessible database using a floor plan mapping component; and
   program instructions to output the image of the floor plan for storage in a computer-accessible floor plan database.

10. The computer program product of claim 9, wherein the program instructions to determine the location of the mobile computing device within the facility comprises utilizing at least one of a global positioning system receiver, a radio-frequency identification (RFID) tag and a RFID reader, a multilateration technique, and a triangulation technique to identify coordinates associated to the location of the mobile computing device.

11. The computer program product of claim 9, wherein the timestamp represents when mobile the computing device is at the location.

12. The computer program product of claim 9, wherein the program instructions to generate the image of the floor plan of the facility comprises plotting on a screen of the mobile computing device each of the coordinates that are stored in the computer-accessible database and represent a position within a boundary of the facility.

13. The computer program product of claim 9, wherein the program instructions to generate the image of the floor plan of the facility comprises drawing barriers within the image of the floor plan of the facility, wherein the barriers are proximate to an outer boundary of areas within through which a person cannot walk within the facility.

14. The computer program product of claim 9, wherein the program instructions to generate the image of the floor plan of the facility comprises overlaying on the image of the floor plan of the facility, one or more lines that represent where a person can walk within the facility and end-users with the mobile computing device have been.

15. A computer system for generating an image of a floor plan of a facility, the computer system comprising:
one or more processors, one or more computer readable memories, one or more computer readable storage media, and program instructions stored on the one or more storage media for execution by the one or more processors via the one or more memories, the program instructions comprising:
program instructions to determine a location of a mobile computing device within a facility using a location determination hardware component, based on coordinates associated to the location that are obtained using the location determination hardware component;
program instructions to assign a timestamp to the coordinates that are associated to the location;
program instructions to store location information in a computer-accessible database, wherein the location information includes the coordinates associated to the location, the timestamp that is assigned to the coordinates, and a unique identifier of the mobile computing device;
program instructions to generate an image of a floor plan of the facility based on the stored location information, wherein generating the image includes accessing the computer-accessible database using a floor plan mapping component; and
program instructions to output the image of the floor plan for storage in a computer-accessible floor plan database.

16. The computer system of claim 15, wherein the program instructions to determine the location of the mobile computing device within the facility comprises utilizing at least one of a global positioning system receiver, a radio-frequency identification (RFID) tag and a RFID reader, a multilateration technique, and a triangulation technique to identify coordinates associated to the location of the mobile computing device.

17. The computer system of claim 15, wherein the timestamp represents when mobile the computing device is at the location.

18. The computer system of claim 15, wherein the program instructions to generate the image of the floor plan of the facility comprises plotting on a screen of the mobile computing device each of the coordinates that are stored in the computer-accessible database and represent a position within a boundary of the facility.

19. The computer system of claim 15, wherein the program instructions to generate the image of the floor plan of the facility comprises drawing barriers within the image of the floor plan of the facility, wherein the barriers are proximate to an outer boundary of areas within through which a person cannot walk within the facility.

20. The computer system of claim 15, wherein the program instructions to generate the image of the floor plan of the facility comprises overlaying on the image of the floor plan of the facility, one or more lines that represent where a person can walk within the facility and end-users with the mobile computing device have been.

* * * * *